Dec. 16, 1930.  J. W. FRY  1,785,118

BALANCING SPRING

Filed Aug. 6, 1928

John W. Fry
INVENTOR.

BY
ATTORNEY

Patented Dec. 16, 1930

1,785,118

UNITED STATES PATENT OFFICE

JOHN W. FRY, OF STRUTHERS, OHIO

BALANCING SPRING

Application filed August 6, 1928. Serial No. 297,669.

This invention relates to suspension springs for motor vehicles and the like, and has for an object to produce a novel and improved spring of great flexibility and at the same time the desired strength for supporting the weight of the vehicle and balancing the same when traveling over rough and uneven roads.

The principal object of this invention is to provide springs of this character with a pair of cross levers, pivoted at a central point between a frame of a vehicle and each having one end shackled to a spring on one side of the vehicle and the other shackled to a spring on an opposite side of the vehicle. Another object of the invention is to provide a second pair of levers, each being pivoted to a suspended member which is in turn pivoted to a frame member of the vehicle. One end of each of this second pair of levers is shackled to a rear spring, while the other end is shackled to the same spring to which the outer end of a cross lever is shackled.

A still further object is to provide a combination of springs and levers, so arranged that when the vehicle is traveling over uneven surfaces, there is a constant balancing movement taking place, resulting in carrying the load or vehicle in an even and balanced position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
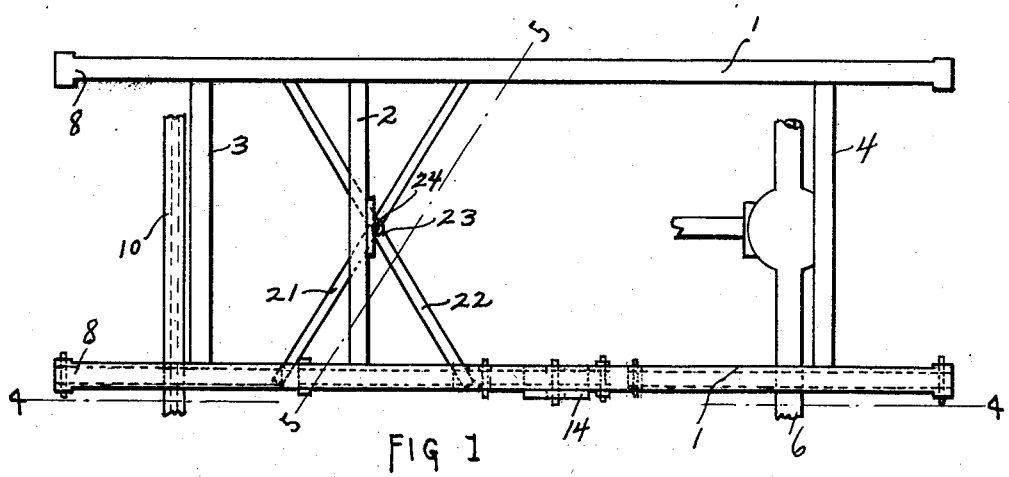
Figure 1 is a top plan view of the device.
Figure 4:
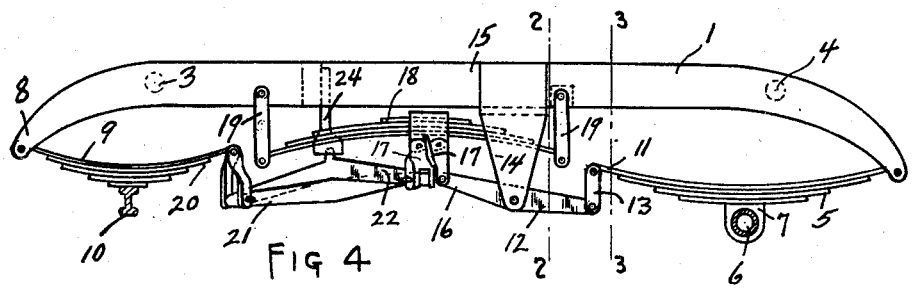
Figure 4 is a cross section taken on line 4—4 of Figure 1.
Figure 5:
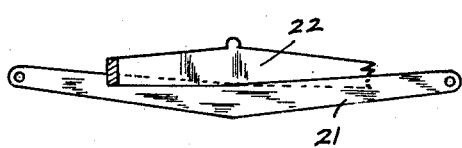
Figure 5 is a cross section taken on line 5—5 of Figure 1.
Figures 2, 3:
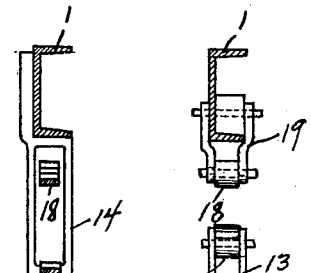
Figure 2 is a cross section taken on line 2—2 of Figure 4.
Figure 3 is a cross section taken on line 3—3 of Figure 4.

By referring to the drawing, it will be seen that I have provided, ordinary frame members 1. This frame member is provided with cross bars 2, 3, and 4. It is understood that the frame members 1 may be connected in other desirable means if necessary. Attached to each of the frame members 1, there is secured a spring 5, which is supported by a rear axle 6 and connecting part 7. The front end 8 of each of the frame members 1 is secured to a spring 9. This spring 9 is supported by a front axle 10. Figure 4 shows a side elevation of the spring arrangement, whereby the springs 5 and 9 are positioned directly underneath the frame members 1. It is understood however that these springs may vary somewhat in their general position but the general arrangement and hookup will remain the same. The inner ends 11 of each of the springs 5 are shackled to a lever 12 by means of a shackle 13. These levers 12 are in turn fulcrumed by means of a support 14 which is in turn securely fastened to the frame members 1 at point 15. Each of the inner ends 16 of the levers 12 are connected to a shackle 17 which is secured to a central spring 18. These central springs 18 are supported on the frame members 1 by means of shackle 19.

The inner ends 20 of the springs 9 are secured to cross levers 21 and 22. These cross levers 21 and 22 are supported preferably at a central crossing point 23, by means of a fulcrum member 24 which is in turn secured to the cross bar 2.

In the construction of the device, the springs 18 are preferably weaker than the springs 5 and 9. It is obvious that as the inner ends 11 and 20 of the springs 5 and 9 respectively are functioning with the levers 12 and the cross levers 21 and 22, the springs 18 are constantly actuated by the vehicle load and by any unevenness of the road over which the vehicle passes. The cross levers 21 and 22 function in order to utilize the balancing means of the springs 18. If the front or rear wheel on the right side of the vehicle is subjected to unevenness, the cross levers 21 immediately tends to balance the vehicle by placing the oppositely positioned spring 18 on the left side of the vehicle into cooperation with the spring 18 on the right side and connecting parts. In order to more clearly understand the action of the spring device in complete assembly with connecting parts, it is pointed out that the supports 14 for the levers 12 are oppositely disposed and secured to the frame members 1. It will also be seen that the fulcrum member 24 is centrally located between the frame members 1, thereby providing a balancing means for the vehicle.

What I claim is:—

1. In a device of the class described, a pair of rear springs, the rear end of each of said springs being attached to a vehicle frame, said springs being supported by a rear axle, a pair of front springs, the front end of each of said front springs being attached to a vehicle frame, each of said front springs being supported by a front axle, a cross bar secured to said frame and positioned between the front and rear axles, a pair of cross levers having their front ends shackled to rear ends of said front springs, said cross levers being pivotally mounted on said cross bar, a pair of oppositely disposed centrally located springs each of which is suspended by shackles to the frame of the vehicle, the rear ends of said cross levers being shackled to the central portion of the centrally located springs, a pair of support members oppositely disposed and secured to each side of said frame, a pair of oppositely disposed levers pivotally secured to said support members, the front end of each of said oppositely disposed levers being shackled to one of said centrally located springs, the rear end of each of said oppositely disposed levers, being shackled to the front end of one of said rear springs, substantially as described.

2. In a device of the class described, a pair of cross levers pivotally mounted underneath a frame of a vehicle at the point of crossing of the levers, a pair of oppositely disposed front springs, the rear end of each oppositely disposed front spring being shackled to the front end of one of the cross levers, a pair of oppositely disposed centrally located springs pivotally secured to said vehicle frame, the rear end of each of said cross levers being pivotally secured to one of said oppositely disposed centrally located springs.

3. In a device of the class described, a pair of cross levers, said cross levers being pivotally mounted at a point underneath a vehicle frame at the crossing point of said levers, a pair of front springs, a pair of rear springs, means for pivotally securing the rear ends of said cross levers to said oppositely disposed centrally located springs, two oppositely disposed levers pivotally secured to said vehicle frame, means for securing the front end of each of said oppositely disposed levers to one of said oppositely disposed centrally located springs, shackle means for connecting the rear ends of each of the oppositely disposed levers to the front ends of one of said rear springs, substantially, as described.

In testimony whereof I affix my signature.

JOHN W. FRY.